United States Patent Office 3,120,996
Patented Feb. 11, 1964

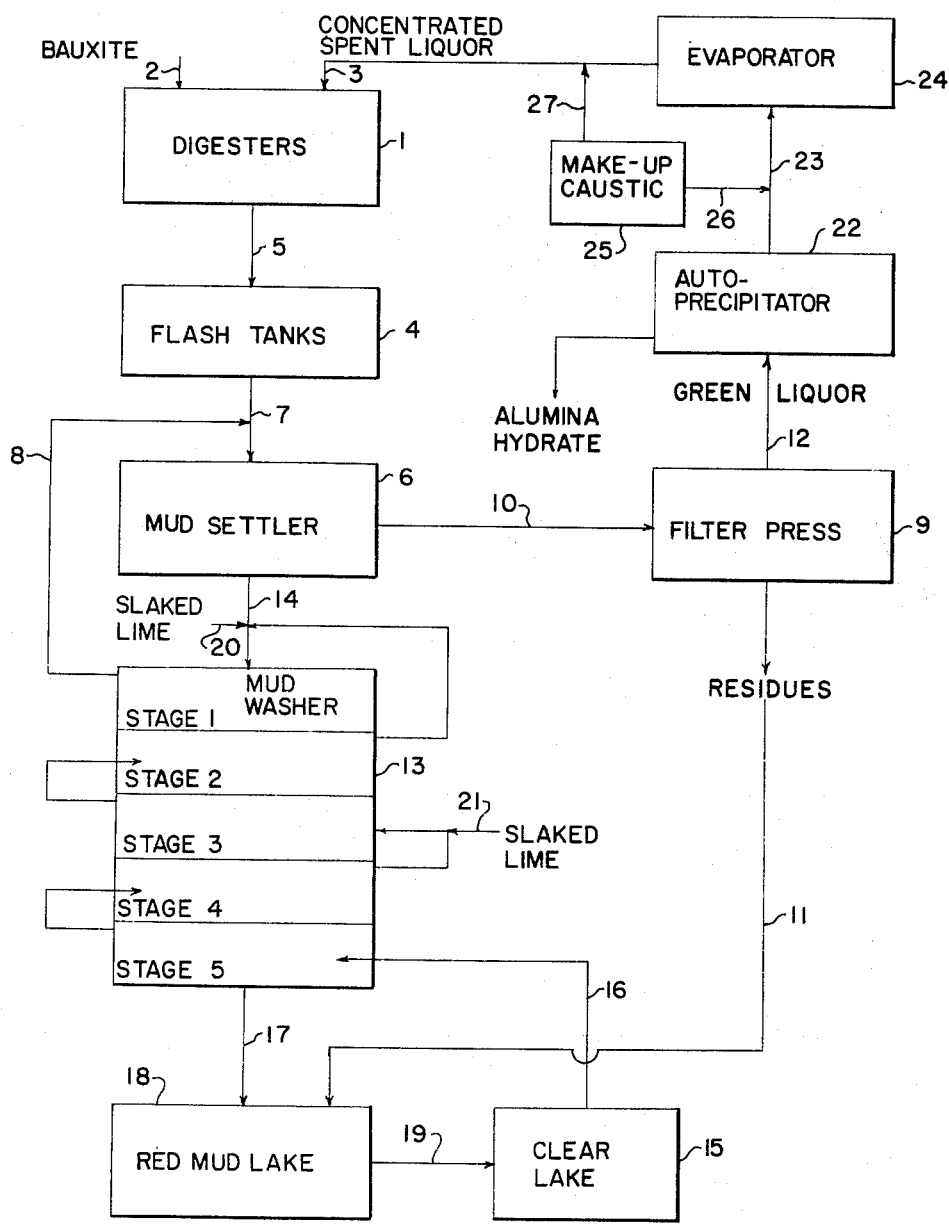

3,120,996
CONTROL OF PROCESS CARBONATION IN BAYER TYPE ALUMINA PLANTS
John L. Porter, Palo Alto, Calif., assignor to Kaiser Aluminum & Chemical Corporation, Oakland, Calif., a corporation of Delaware
Filed Apr. 19, 1960, Ser. No. 23,283
5 Claims. (Cl. 23—141)

The present invention relates to alumina extraction from bauxite by a Bayer type process, and it is particularly concerned with the procedure of overcoming the accumulation of sodium carbonate in the circulating liquor generally termed process carbonation.

The problem of process carbonation arises particularly in processing according to North American practice of Jamaican bauxite which, as reported in the literature, contains about twelve times the amount of caustic soluble organic material as that found in European bauxite.

Further to be noted is the fact that while according to European practice, particularly upon French bauxite, the dissolving caustic liquor employed in the treatment of the said French bauxite which is a monohydrate, is far more highly concentrated than is the practice in North America where the bauxites employed are generally trihydrates or mixtures of trihydrates and monohydrates.

Because of the high concentration of the digestion liquor required according to European practices the concentration by evaporation of the liquor in advance of digestion reduces the content of free sodium carbonate or process carbonation by deposit of the same as crystals in the evaporator from which such crystals are removed.

Where, as in North American practice, the digestion liquor is not so highly concentrated the excess free sodium carbonate tends to accumulate and build up to the detriment of the overall efficiency of the system. As pointed out in the patent to Cundiff, 2,522,605, unless special provisions are made for the control of this process carbonation it is necessary to operate the main plant circuit at a low concentration of caustic soda which decreases significantly the production capacity of a given Bayer process plant. This can become a highly critical factor in operating upon bauxites, such as Jamaica bauxite, which are subject to accumulation of a high degree of process carbonation. This application is a continuation-in-part of my copending application Serial No. 350,849, filed April 24, 1953, which is a continuation-in-part of my prior application Serial No. 205,797, filed January 12, 1951, both now abandoned.

The Bayer process comprises, in general, an alkaline digest of aluminous ores, usually under pressure, to solubilize the alumina values contained therein, followed by the separation of the residues from the digestion phase and the autoprecipitation of alumina from the pregnant liquors to recover the hydrated alumina in substantially pure form. The separated insoluble residues are washed with water for the recovery of the soda and alumina values in the liquor associated therewith, usually, as in modern practice, by countercurrent decantation methods in conjunction with a red mud lake. After separation of the hydrate alumina, the clarified spent liquors are concentrated and recycled for further extraction purposes in the digestion phase.

The principal constituents of the Bayer liquors are sodium hydroxide, sodium aluminate and sodium carbonate. Also present are small amounts of inorganic sodium compounds, such as solubilized salts of silicates, phosphates, chlorides and vanadates, as well as organic sodium compounds, such as sodium oxalates and humates and other higher molecular weight organic compounds. Of the principal constituents, the caustic soda is the essential active substance which dissolves and transports the alumina as sodium aluminate, the sodium carbonate being considered an impurity, a low level of which in the circulating liquor is highly desirable. The remaining sodium salts are likewise impurities, but are not normally present in the large quantities peculiar to sodium carbonate. Control of the amount of sodium carbonate is, of course, desirable in order to decrease and minimize the amount of inactive soda circulating and being handled throughout the process. By inactive soda it is meant soda in a form wherein it will not combine with alumina, and the sodium carbonate content in the liquor is by far the major constituent of such "inactive soda."

The source of introduction of sodium carbonate varies somewhat according to the particular type of Bayer process being operated, i.e., whether processing is for the recovery of either the trihydrate or monohydrate alumina or both. Nevertheless, the caustic solutions, in general, tend to pick up $CO_2$ present in the atmosphere, as well as indirectly through the organic matter present in the bauxite and the starch which is used as a flocculent. Thus, the humus and other organic matter which is present in many soils associated with aluminous ores is solubilized to a substantial degree in the caustic aluminate liquors in the form of sodium salts of higher molecular weight organic compounds and upon constantly being recycled throughout the process are degraded at the elevated temperatures, present among other places in the digesters, to the more or less ultimate form of sodium carbonate. The amount of organic matter contained in and solubilized from the bauxites is greater with the tropical and semi-tropical aluminous ores than those of non-tropical latitudes, and especially so in the case of bauxites obtained from Jamaica. Likewise, the starches used during clarification are solubilized in the liquors to an appreciable extent and contribute to the overall concentration of sodium carbonate in the liquors by forming similar high molecular weight organic compounds which ultimately degrade. This source of carbonate soda from the starches, which are solubilized in substantial amounts and ultimately degraded, is of increasing importance according to the settling characteristics of the residues from the bauxite being processed because greater quantities of starch are necessary for ores having a more finely dispersed red mud after extraction, such as those from Jamaica. Consequently, a greater amount of sodium carbonate is ultimately formed from the greater quantities of solubilized starch used, and this necessarily contributes to a greater extent to the overall process carbonation.

The problem of process carbonation is acute in the processing of Jamaican bauxite according to North American practice due to the factors of:

(1) High organic content of the bauxite (of the order of 0.25%).

(2) The need for many times greater amounts of starch as a flocculating agent because of the finely subdivided state of the iron oxide content and the high ratio of mud involved.

(3) The North American practice of a relatively low degree of concentration of the digestion liquor in the evaporator.

In trihydrate extraction systems, so-called "inside causticizing" is customarily practiced as one means of controlling the amount of circulating sodium carbonate while simultaneously producing make-up caustic soda. Essentially, this practice includes adding lime during the digestion phase of the process in sufficient quantities to causticize a portion of the contained sodium carbonate to form caustic soda and insoluble calcium carbonate, or the addition of lime and soda ash as an added source of sodium carbonate for conversion to the required caustic soda make-up product. In the latter case the net effect of adding soda ash is to decrease the initial caustic to total soda ratio under the prevailing digester condition and afford a greater amount of soluble sodium carbonate available for conversion purposes.

With this inside causticizing practice, the caustic soda concentration in the digester effluent is limited to about 3.2 N or about 170 grams per liter for the attainment of practical amounts of conversion of sodium carbonate to caustic soda. For example, under digester caustic soda conditions of about 170 grams per liter, about 25% of the total soda present in the circulating liquor will remain as sodium carbonate with the resultant maximum attainable caustic soda to total soda ratio of only about .75. Otherwise, for greater utilization of the lime added, lower caustic soda concentrations, that is, impractically high dilution in the digester phase, are necessitated. Accordingly, the conditions required for the lime causticizing reaction in the digester then serve to limit the caustic soda concentration during digestion and the $C/S$ ratio attainable in the circulating liquors. For example, the preferred conditions for best lime efficiency during the period allowed for causticizing is about 160 grams per liter caustic soda and a caustic soda to total soda ratio of about .70, whereas higher caustic concentrations are highly desirable for extraction purposes and steam economy. Moreover, because of the limit on the caustic soda to total soda ratio obtainable, the amount of recycling sodium carbonate is correspondingly high. "Total soda" or S, as herein used, refers to the sum of the caustic soda or C (which is calculated to include free NaOH and the soda combined as sodium aluminate) and sodium carbonate, and further represents the alkaline soda in the liquor, C being expressed in terms of the equivalent sodium carbonate. Thus, $S=C+Na_2CO_3$. Accordingly, the ratio of the caustic soda to the total soda ($C/S$) presents a factor which expresses the fraction of the total soda which is capable of being utilized for alumina extraction purposes. Thus, the nearer the caustic soda to total soda ratio can be maintained to theoretical unity, the higher the extraction, retention and transporting potential of the liquor with respect to alumina, since each unit volume of liquor contains more active caustic soda and less inactive carbonate soda.

To further show the desirability of maintaining a high caustic soda to total soda ratio, the amount of steam required for heating in the digesters is proportional to the amount of liquor circulated and the yield of alumina per unit of liquor circulated is proportional to the caustic soda concentration, that is, the extraction efficiency. Thus, it is also desirable for digester steam economy to circulate a concentrated liquor of high caustic soda content relative to total soda.

When a bauxite is being processed for the extraction of the more difficultly soluble monohydrate alumina wherein a much higher caustic soda concentration is required than in a trihydrate alumina extraction process, it is not practical to use inside causticizing of soda, chiefly because the caustic soda to total soda ratio obtainable and the lime utilization in the causticizing reaction are both sharply lowered as the caustic soda concentration is increased. Secondly, the conversion of soda ash to caustic soda, being capable of giving only a low caustic soda to total soda ratio, presents, a problem in that the excess sodium carbonate precipitates during normal plant concentration of the spent liquors by evaporation with the resultant evaporator scale problem. Accordingly, causticizing of the soda ash with lime to produce the make-up soda is normally performed outside of the main liquor streams to attain higher conversion and $C/S$ ratios in order to obviate these problems and thus has been termed "outside causticizing." This outside causticizing of the incoming soda to produce the required make-up caustic soda may also be advantageously practiced when processing for the extraction of only trihydrate alumina as well as when treating monohydrate alumina containing ores according to the Bayer process, the greater lime efficiency by causticizing in the more dilute solutions of soda ash and the possibility of reburning the calcium carbonate sludge for reuse of the lime, as opposed to the lime losses sustained through the calcium carbonate sludge removal and loss with the red mud residues during inside causticizing, contributing to the general increase in efficiency and economy of operation of the process.

Nevertheless, outside causticizing, as practiced, is not a complete reaction, the conventional lime causticizing operations only transforming about 85% to 95% of the soda ash to caustic soda. Consequently, whichever causticizing operation is performed, there is an overall contribution by the particular lime causticizing operation to the so-called "process carbonation" necessarily attendant with Bayer extraction process. "Process carbonation" as generally used refers to the sodium carbonate which is continually entering or being produced in the Bayer liquors regardless of the source. Thus, it includes carbonate directly introduced as a result of causticizing operations, and carbonate formed by atmospheric pick-up of $CO_2$, as well as that formed by solubilization of higher molecular weight organic compounds with subsequent degradation to the more or less ultimate form of sodium carbonate.

As previously stated, there are certain limitations which prevent greater than about 85% to 95% conversion of the soda ash to caustic soda during outside causticizing practice as associated with Bayer practice. For example, it is well known that greater conversion of soda ash to caustic soda by reaction with lime takes place in dilute solutions. However, the eventual evaporation of the dilute caustic soda solutions to those concentrations necessary for extraction purposes limits the economies accompanying dilute causticizing practice. Accordingly, the loss of the lime sludge and the incomplete conversion of soda ash present in inside causticizing systems with the resultant recirculation of relatively large quantities of sodium carbonate, and the incomplete conversion found in outside causticizing practice are not practically offset using dilute solutions in causticizing due to the evaporation costs.

I am aware that it is proposed in the British patent, No. 506,885, to dilute the products of digestion of the bauxite with outside water and with diluted lye, and by means of a thickener decant the diluted aluminate lye which, after alumina precipitation, is concentrated by evaporation and returned to the digester. The residue of red mud, after a further thickening and the introduction of make-up caustic from an outside causticizer, is filtered out of the liquor in which it is suspended and discharged. The filtrate of mud filtration is conveyed to the diluter of the initial products of digestion.

The outside causticizer causticizes soda with lime in highly dilute solution and with long time contact, and with a small excess of lime is said to be able to convert the soda completely or almost completely to caustic. This means that the "small excess" is required for completing the make-up caustic reaction and none is available for removing process carbonation. In European systems, such as that of the said British patent, process carbonation is taken care of in the evaporator.

In the system of the patent, the necessity for the highly dilute operation of causticizing strongly conflicts with the necessity for high caustic concentration in the digester. Increasing the work of the evaporator involves increase in the cost of steam and difficulties resulting from scaling of the evaporator surfaces.

No need for control of "process carbonation" is provided or contemplated in the patent because the problem is solved in the evaporator, where sodium carbonate is crystallized out in accordance with European practice. In accordance with the teachings of the patent, stoichiometric proportions of lime and soda ash do not result in complete reaction in the causticizer. A small excess is required for completing the make-up caustic reaction.

This obviously does not suggest control of process carbonation which is a chief object of applicant's invention.

In the preferred embodiment of applicant's system, the wash liquor is circulated through a pond or lake system which washes back the alumina values through a countercurrent decantation system. The introduction of lime involves very little if any diluting water. The make-up caustic is added to the main circulating liquor. The load on the applicant's evaporator is therefore a minimum. This improves volumetric efficiency.

Accordingly, one object of the herein described invention is to control the amount of sodium carbonate contained in circulating Bayer liquors independently of the make-up caustic which is added to the circulating caustic liquor returned to the digester.

Another object is to control the amount of circulating sodium carbonate by causticizing the same within the washing system in a manner which serves to decrease the instability of the supersaturated caustic aluminate liquors.

It is a further object to decrease the losses of alumina during the ore residue washing stages by producing caustic soda in situ from the sodium carbonate contained in the caustic aluminate liquor associated with the residue.

It is still a further object to substantially reduce the loss of alumina during red mud washing and increase the efficiency of mud washing by causticizing the sodium carbonate in the liquor associated with the mud without increasing the total soda content during the mud washing operation.

It is a further object to minimize the autoprecipitation of alumina hydrate during the red mud washing stages of the Bayer process by causing a localized decrease in the alumina-to-caustic soda ratio of the liquor adjacent the red mud residues being washed.

It is a further object of the invention to decrease the amount of alumina hydrate lost by autoprecipitation during red mud washing without decreasing the efficiency of mud washing as in other methods for controlling the losses of alumina during mud washing by autoprecipitation wherein the total soda content of the liquor in the mud washing stage is increased.

Further, it is an object of the invention to provide a method of controlling the loss of alumina hydrate through autoprecipitation during the red mud washing stages when either fresh water or wash waters from a red mud lake are used for washing purposes.

It is a further object to provide a method of effectively maintaining a high caustic soda to total soda ratio in the circulating Bayer liquors which may be used in process plants employing either monohydrate alumina or trihydrate alumina extracting conditions.

It is a still further object to provide a method of controlling the loss of alumina hydrate by autoprecipitation during the red mud washing stage of the Bayer process by causticizing the contained sodium carbonate of the circulating liquor in the mud washing stage independently of the make-up caustic which is added to the circulating caustic liquor returned to the digester.

Other objects will become apparent from the following discussion, examples and figure presented.

According to the herein described invention, a more effective and practical means for controlling the alumina-to-caustic soda ratio under the mud washing conditions has been devised which also provides an effective means for controlling process carbonation. This is especially adapted for use with the Dorr type countercurrent decantation processes, although not necessarily limited thereto. The method comprises adding lime or slaked lime to the washing stages to causticize the sodium carbonate circulating in the liquor stream independently of the make-up caustic which is added to the circulating caustic liquor returned to the digester. By this method, it is possible to causticize the sodium carbonate in the plant liquor stream in an efficient manner to maintain comparatively high ratios of caustic soda to total soda in the main liquor stream while maintaining at the same time a comparatively high caustic soda concentration associated therewith, and further, control of autoprecipitation in the mud washers. The method may be used with either the American trihydrate or European monohydrate alumina version of the Bayer process. Moreover, it may be utilized in conjunction with the addition of make-up caustic soda in the form of either electrolytic caustic soda or lime causticized soda which is added to the circulating liquor returned to the digester.

The advantages of controlling process carbonation by the addition of lime to the red mud washing stage of the process are shown by a comparison of the tabulated data which follows wherein Case A represents results and conditions which prevail during control of process carbonation when practicing inside causticizing, as in a trihydrate alumina extraction system, and Case B represents similar conditions when control of the carbonate is maintained to a substantial extent in the red mud washing phase of the process. For comparative purposes it has been assumed that the total soda concentrations in the main plant liquor streams for both cases are equal, a fair comparison. Experience has shown the desirability of limiting the soda concentration to some such value. The information is presented on the following basis of variables obtained from actual plant experience.

| | |
|---|---|
| Basis | 1000 tons of alumina recovered. |
| Bauxite consumption | 2000 tons having 51% available $Al_2O_3$. |
| Alumina extracted | 1020 tons. |
| Alumina recovered | 1000 tons. |
| Mud settler underflow | 20% solids. |
| Mud washer underflow | 20% solids. |
| Mud washer dilution | 2.5 tons lake water per ton of red mud residues. |
| Lake water | $A/C=.60$; $C/S=.70$; 10 g./l. T.S. |
| Maximum total soda concentration in mud settlers | 230 grams per liter. |
| Pregnant liquor | $A/C=.620$. |

CASE A

This is based on a conventional operation wherein inside causticizing is practiced or with the only control of process carbonation being that maintained through the addition of lime to the digesters to give a $C/S$ ratio of .73 in the green liquor therefrom or 168 grams per liter caustic soda in the liquor from the mud settlers.

CASE B

This is based on the control of process carbonation by the addition of slaked lime to the mud washers independently of the make-up caustic delivered with the circulating caustic liquor to the digester to give a $C/S$ ratio of .80 in the green liquor or a caustic soda concentration of 184 grams per liter in the liquor from the mud settlers.

CASE A

| | Tons |
|---|---|
| Mud settler underflow: | |
|     Solids | 460 |
|     Liquor | 1840 |
|     T.S. | 343.89 |
|     C.S. | 251.04 |
|     $Al_2O_3$ | 155.64 |
| Mud washer overflow: | |
|     Liquor | 2990 |
|     T.S. | 335.71 |
|     C.S. | 244.70 |
|     $Al_2O_3$ | 151.53 |
| Mud washer underflow: | |
|     Solids | 460 |
|     Liquor | 1840 |
|     T.S. | 37.77 |

CASE A—Continued

Mud washer underflow: Tons
- C.S. — 27.06
- $Al_2O_3$ — 16.55

Lake water:
- Solution — 2990
- T.S. — 29.60
- C.S. — 20.72
- $Al_2O_3$ — 12.44

CASE B

Mud settler underflow: Tons
- Solids — 460
- Liquor — 1840
- T.S. — 343.89
- C.S. — 275.08
- $Al_2O_3$ — 170.43

Mud washer overflow:
- Liquor — 2990
- T.S. — 335.71
- C.S. — 283.42
- $Al_2O_3$ — 165.43

Mud washer underflow:
- Solids — 460
- Liquor — 1840
- T.S. — 37.77
- C.S. — 28.50
- $Al_2O_3$ — 17.43

Lake water:
- Solution — 2990
- T.S. — 29.60
- C.S. — 20.72
- $Al_2O_3$ — 12.44

A material balance for Case B indicated the following:

In—
- Liquor 1840+2990=4830
- T.S. 343.89+29.60=373.49
- C.S. 275.08+20.72=295.80
- $Al_2O_3$ 170.43+12.44=182.87

Out—
- Liquor 2990+1840=4830
- T.S. 335.71+37.77=373.48
- C.S. 283.42+28.50=311.92
- $Al_2O_3$ 165.43+17.43=182.86
- Lime used (311.92—295.80) (56/106) (1/.85) =10.0 tons It is apparent from an inspection of the material balance that 16.1 tons of sodium carbonate is converted to caustic soda, of which 8.34 tons is gained in the system through removal with the mud washer overflow.

A comparison of quantities for both cases clearly brings out the advantages obtained from control of the sodium carbonate by means of adding lime to the washers independently of the make-up caustic delivered to the digester.

| | Case A | Case B |
|---|---|---|
| Caustic soda to the precipitators | 3,338.3 | 3,383.3 |
| Caustic soda Mud Washer Overflow | 244.7 | 283.4 |
| Caustic soda in Mud Settler Overflow | 3,138.6 | 3,099.9 |
| Caustic soda in Mud Settler Underflow | 251.04 | 275.08 |
| Caustic soda to Mud Settlers | 3,389.6 | 3,375.0 |
| Total soda | 4,643.2 | 4,218.7 |
| Flow of liquor to Mud Settlers (gallons per minute) | 3,361.9 | 3,054.5 |
| Alumina produced/total soda circulated | .2154 | .2320 |
| Alumina produced/gallon circulated to settler | .4131 | .454 |
| Alumina produced/caustic soda ratio of washer overflow | .619 | .584 |
| Caustic soda to total soda ratio of washer overflow | .728 | .844 |

The increase in yield of alumina per pound of soda circulated or per gallon of liquor circulated shown in Case B indicates the increase in economy and efficiency of Bayer plant operation when using the herein described method of controlling the process carbonation and maintaining a high $C/S$ ratio. Thus, (.2320—.2154/.2154) or 7.7% more alumina is capable of being produced or carried per unit of total soda circulated by adding lime for causticization purposes during the mud washing phase of the process. Moreover, the same production rate is capable of being maintained at an overall decreased rate of flow, as for example a (3361.9—3054.5/3361.9) or 9.14% decrease in the amount of liquor flowing to the mud settlers. This decreased flow rate for the same amount of production is, of course, reflected throughout the process in equipment savings and decreased pumping costs and filter cloth consumption, among other things.

Moreover, the ability to maintain a high caustic soda to total soda ratio of .844 in the mud washer overflow with lime causticization as compared to a .728 with control of process carbonation only during the digestion phase materially reduces the alumina-to-caustic soda ratio in the mud washer overflow, as for example, from a .619 to .584, with the consequential beneficial results in decreasing the losses from autoprecipitation of alumina hydrate during mud washing.

According to the invention the control of process carbonation in a Bayer system may be completely performed independently of caustic make-up to the digester, during the mud washing phase of the process and is not dependent on control during digestion or at the evaporation level, as by salting out the sodium carbonate. The invention is not, however, necessarily limited to a system wherein no other control method is utilized, but may be practiced alone or in conjunction with other carbonate control means.

The method of controlling process carbonation independently of caustic make-up to the digester by causticizing during mud washing operation as used preferably with countercurrent decantation washing systems, such as the Dorr type commonly found in American practice, has further advantages other than merely controlling process carbonation and is based on the discovery that the lime slurry causes causticizing of soluble sodium carbonate where the production of caustic soda is needed most, i.e., causticizing takes place principally in and about the insoluble mud residue particles causing a localized reduction in the alumina-to-caustic soda ratio, and consequently a decrease in the tendency of the soluble alumina to autoprecipitate as the insoluble hydrate on the mud particles. This is an extremely important observation in that once alumina hydrate particles are formed on the red mud they act as seed for the further deposition of greater amounts of insoluble hydrate with a corresponding accelerated loss of alumina with the insoluble residues. By the method of the invention when employed with countercurrent systems, the formation of insoluble alumina hydrate particles is minimized by the establishing of more stable conditions in the liquor surrounding or adherent to the residue particles because the major amount of causticizing takes place in this vicinity as the reactant lime settles with the mud. In contrast to my method, in other methods where make-up caustic soda is added from an outside source either in the form of outside causticizer effluent or as caustic soda per se, the alumina-to-caustic soda ratio is lowered throughout the solution, including the supernatant liquor, and is consequently less effective in the zones wherein most of the loss of alumina takes place. It is well known that solubility of lime decreases as temperature increases. Thus, for example, solubility of calcium hydroxide in water at 100° C. is 0.071 gram per 100 grams of saturated solution, whereas the solubility at 0° C. is 0.185 gram per 100 grams of saturated solution. Sodium carbonate is moderately soluble in cold water and very soluble in hot water. Consequently, in these warm processing liquors the sodium carbonate, highly soluble in hot water, tends to move readily to the overflow in the countercurrent washing system, whereas the lime being relatively insoluble in hot water tends to move with the red mud to the underflow in said washing system. The solubility of the calcium hydroxide is further depressed by the presence of sodium hydroxide. As a consequence, causticization continues on down through the washing system effectively reducing the process carbonation, that is, the uncombined sodium carbonate, and simultaneously reducing the $A/C$ ratio where it is most effective to prevent autoprecipitation of the alumina hydrate among the particles of the red mud. The physical characteristics, particularly solubility characteristics, lend a unique advantage to the mud washing system of my invention for the control of process carbonation and inhibiting autoprecipitation of the alumina hydrate in the aforesaid washing system.

The advantages of lime addition as regards decrease in premature autoprecipitation of alumina may be ascertained from an inspection of the material presented in Table I. Test 1 shows the results of laboratory work which simulate a first stage mud washing condition wherein no control of the loss of alumina is attempted. Test 2 shows simulated first stage mud washing conditions wherein caustic soda is added to decrease the overall alumina-to-caustic soda ratio so as to decrease the loss of alumina from autoprecipitation, and may be taken as substantially representing conditions which prevail when either caustic soda per se is added or caustic soda is added from an outside source in the form of causticizer effluent. Test 3 shows a simulated first stage mud washing condition wherein lime is added to the mud washer for control of autoprecipitation by causticizing the sodium carbonate present in the liquor from the red mud settlers.

For all tests an identical green liquor having the following characteristic ratios was employed: $A/C=.631$; $C/S=.815$ and $A/S=.514$. Mud washing conditions were likewise identical in that equal amounts of mud were used in each test and were subjected to conditions such as are found in one of the washing stages of a conventional countercurrent washing system. Thus, the muds were subjected to mud washing conditions of 80 grams per liter total soda at 200° F. for four hours. Thereafter samples of the underflow and overflow were obtained and the soluble constituents analyzed.

The green liquor for the tests contained 18.51 grams of alumina ($Al_2O_3$), 29.35 grams of caustic soda (expressed as the equivalent carbonate), and a total soda analysis of 36.00 grams (also expressed as the equivalent carbonate). For Test 2, 2.14 grams of caustic soda were added to decrease the $A/C$ ratio for control of autoprecipitation. In Test 3, an amount of lime equivalent to produce 2.23 grams of caustic soda was added to causticize a portion of the sodium carbonate and thereby reduce the alumina-to-caustic soda ratio.

*Table I*

TEST 1

| | Underflow | Overall | Overflow |
|---|---|---|---|
| A (grams) | 8.26 | | 7.22 |
| C (grams) | 16.62 | | 11.37 |
| S (grams) | 20.63 | | 14.44 |
| A/C | .497 | .553 | .635 |
| A/S | .400 | .432 | .500 |
| C/S | .806 | .798 | .787 |

TEST 2

| | Underflow | Overall | Overflow |
|---|---|---|---|
| A (grams) | 9.25 | | 8.89 |
| C (grams) | 15.65 | | 15.04 |
| S (grams) | 19.23 | | 18.11 |
| A/C | .591 | .591 | .591 |
| A/S | .482 | .488 | .490 |
| C/S | .814 | .822 | .830 |

TEST 3

| | Underflow | Overall | Overflow |
|---|---|---|---|
| A (grams) | 11.00 | | 7.24 |
| C (grams) | 18.72 | | 11.87 |
| S (grams) | 22.08 | | 14.49 |
| A/C | .588 | .596 | .610 |
| A/S | .498 | .499 | .500 |
| C/S | .848 | .836 | .819 |

By comparing the overall alumina to total soda ratios with the $A/S$ ratio for the green liquor it is apparent that the amount of alumina remaining in solution after the four-hour treatment in each case is less than originally present in the green liquor. Thus, where no attempt was made to control the autoprecipitation of alumina as in Test 1, the $A/S$ ratio decreased from .514 to .432. Moreover, this loss in alumina is representative of only the amount lost during the first stage of washing, and does not account for losses in subsequent stages. In Test 2, the loss of alumina is appreciably less in that the $A/S$ ratio decreased only to .488 from .514, and accordingly there is a marked improvement over conditions wherein no control of the alumina-to-caustic soda ratio is attempted. Nevertheless, this decrease in $A/S$ ratio does signify a loss of alumina which is not recoverable. On the other hand, where the alumina-to-caustic soda ratio is lowered by causticizing part of the sodium carbonate with lime, the decrease in $A/S$ ratio is to .499, a substantial improvement over either of the conditions represented in Tests 1 or 2 for corresponding mud washing conditions. It will be shown subsequently that the loss in alumina here shown in Test 3 is not in reality entirely a loss, but rather a temporary insolubility of alumina, probably as calcium aluminate, which subsequently reacts with more sodium carbonate to form the insoluble calcium carbonate and soluble sodium aluminate in subsequent washing stages. Consequently, the advantages of lime addition in Test 3 are not fully represented. Nevertheless, such partial showing indicates significant improvements over the results obtained in Test 1 or 2.

That the alumina is principally lost in the underflow as a precipitated solid associated with the particles of red mud is apparent from a consideration of the difference in $A/S$ ratios between the overflow and underflow for the respective tests. Thus, the $A/S$ ratio for the underflow in each test is lower than the overflow. On the other hand, the benefit of lime addition as in Test 3 in decreasing this loss of alumina in the underflow is apparent from the .002 $A/S$ ratio difference between the overflow and underflow as compared to .008 for Test 2 and .100 for Test 1. It is also apparent from Test 3 that causticizing has taken place principally in the underflow as indicated by the high $C/S$ ratio contained therein, and correspondingly greater reduction of the $A/C$ ratio in the underflow than found in Test 2 as compared to the overall results for the respective tests. This further indicates that lime addition causticizes the liquor associated with the mud; that is, it localizes causticizing at the point where it is needed. This is understandable from the relative solubilities in the hot liquor of the lime and of the soda.

With reference to countercurrent decantation washing systems, if fresh water is used for washing purposes, the decrease in $A/C$ ratio which attends the addition of effective amounts of caustic soda, carries through to subsequent washing stages and correspondingly aids in maintaining conditions in the lower stages whereby less autoprecipitation of alumina hydrate will take place. Nevertheless, with greater dilution, the equilibrium solubility ratio decreases and consequently there is a still greater tendency for the liquors in the latter stages of washing to autoprecipitate insoluble alumina hydrate. As a result, there is need for more caustic soda to maintain a proper alumina-to-caustic soda ratio in the subsequent stages which may be supplied through larger quantities being added initially to the feed or by subsequent additions in the later washing stages. This subsequent addition from an outside source has substantially the same overall disadvantages as an initial addition of large quantities of caustic from an outside source.

Although the net effect of adding lime to the countercurrent mud washing system is the same as normal causticizing of sodium carbonate with slaked lime to produce caustic soda, according to the equation $$Na_2CO_3 + Ca(OH)_2 = CaCO_3 + 2NaOH$$

the overall chemistry of the present invention is more complicated. Although a portion of the soda may be causticized directly by the above reaction, there is another mechanism which probably represents the major portion of the total. This mechanism involves first a reaction of the lime with the dissolved alumina (sodium aluminate) to precipitate calcium aluminate and generate caustic soda according to the equation $$3Ca(OH)_2 + 2NaAlO_2 + 4H_2O = 3CaO \cdot Al_2O_3 \cdot 6H_2O + 2NaOH$$

Several such hydrated calcium aluminates exist, but for purpose of example it is assumed that this system produces the common tricalcium aluminate which is well known in cement technology. The calcium aluminate is precipitated when the lime is added, and the concentration of alumina is a maximum in the mud washing circuit. Upon further dilution in later stages of the mud washing circuit the equilibrium changes and calcium aluminate reacts with the dissolved sodium carbonate to produce calcium carbonate, caustic soda and dissolved alumina according to the equation $$3CaO \cdot Al_2O_3 \cdot 6H_2O + 3Na_2CO_3 = 3CaCO_3 + 2NaAlO_2 + 4NaOH$$

The net effect of these two reactions is the equivalent of the direct causticizing of soda ash.

It will be observed that the last reaction produces a solution having an $A/C$ ratio of 0.33, based on sodium carbonate equivalents, which is a stable ratio equivalent to that obtained in the precipitation step of the Bayer process.

According to the invention the addition of lime to the washer substantially overcomes the above disadvantages in that there is a fundamental difference between lime causticization of aqueous $Na_2CO_3$ solutions and $Na_2CO_3$ solutions in Bayer aluminate liquors which has not been fully exploited. Thus, the normal reaction of calcium hydroxide (slaked lime) with sodium carbonate is the direct formation of insoluble calcium carbonate and sodium hydroxide. On the other hand, when slaked lime is present in a caustic aluminate solution, the reaction with sodium carbonate is to a substantial extent via an indirect route with an intermediate insoluble calcium aluminate being formed. Thereafter, the calcium aluminate reacts with the sodium carbonate to form the insoluble calcium carbonate and sodium aluminate. Thus, not only is the addition of lime to produce NaOH in situ an improvement over addition of previously formed NaOH, such as through direct insertion of caustic soda or as outside causticized effluent, in that the reaction is somewhat localized because the lime and calcium aluminate particles settle with the mud and causticize in the region where the catalysts for autoprecipitation are formed, but the intermediate reaction allows a lowering of the $A/C$ ratio, throughout the subsequent mud washing stages to a substantial extent by the delayed reaction with sodium carbonate.

The material presented in Table II shows the causticizing effect of lime in the presence of red mud in an aluminous sodium carbonate liquor having a total soda concentration of about 85 grams per liter, and clearly brings out the intermediate reaction which takes place when sodium carbonate is causticized by lime in the presence of soluble aluminates.

*Table II*

| | Settler U' F. | 3 min. | 6 min. | 15 min. | 23 min. | 34 min. |
|---|---|---|---|---|---|---|
| T.S. or (S), grams/liter | | 84.70 | 85.5 | 83.4 | 84.4 | 83.59 |
| A/C | .638 | .624 | .622 | .613 | .612 | .608 |
| A/S | .527 | .515 | .506 | .519 | .519 | .529 |
| C/S | .825 | .825 | .814 | .845 | .848 | .852 |

In this laboratory experiment a simulated mud settler underflow was prepared from a digested charge of bauxite and liquor and transferred with appropriate dilution water so as to simulate a first stage mud washing condition such as may be found in a countercurrent system. An amount of lime equivalent to 3.5 grams per liter (expressed as $CaCO_3$) was added and the contents stirred throughout the reaction time at 200° F. Samples were withdrawn at various times, as indicated in Table II, and analyzed.

From an inspection of the material presented, it is apparent that a considerable amount of alumina is removed from the solution in a comparatively short time, as evidenced by the sharp decrease in alumina to total soda $(A/S)$ during the first six minutes to 506. Since the total soda concentration does not change appreciably during the treatment, it is apparent that an insoluble aluminate is formed. The subsequent return of the alumina to the solution is evidenced by the increase in $A/S$ ratio after reaching a minimum at approximately six minutes. The fact that the alumina-to-caustic soda ratio $(A/C)$ continues to decrease and the caustic to total soda $(C/S)$ ratio continues to increase throughout the experimental run brings out the subsequent causticizing which takes place as the insoluble aluminate becomes soluble once more. Thus, the $A/C$ ratio decreased to a .608 value after 34 minutes from .638 in the settler underflow. Conversely, the $C/S$ ratio increased from .825 to .859.

The above example embodies the use of a synthetic liquor as opposed to a Bayer plant liquor containing organic material. Similar results are experienced with Bayer liquors except that the rate of the reaction is materially decreased. This is probably the result of the organic material decreasing the surface activity for the suspended lime and insoluble calcium aluminate particles. Regardless of the theory, this retarded reaction has certain advantages in actual operation in that the reactions proceed gradually throughout the major portion of the mud washing operation and thereby afford caustic soda in the latter stages of mud washing wherein the liquors become less stable due to dilution.

Moreover, where a red mud lake system is used as the source of wash water, rather than fresh water, the addition of lime to the washers is even more important. The lake system as used in American Bayer practice comprises a lake whereto the mud residues from the washing system are pumped, the lake serving as a depository for the washed residues, the lake water being reused for mud washing purposes. In this manner, the lake serves as a final washing stage whereby the lake waters are continually returned to the Bayer liquors through dilution of the mud washer overflows which are combined with the main plant liquor streams. Dilution from normal rainfall and, in some cases, additions of fresh water to the washers compensate for the losses from evaporation, etc. A considerable amount of process carbonation takes place in the lake waters through atmospheric pick-up of $CO_2$ and, accordingly, the amount of solubilized sodium carbonate increases in the wash waters from the lake at the expense of the caustic soda over the corresponding values in the liquors being pumped together with the residues to the lake from the mud washing system. The decrease in caustic soda during the mud lake residence time also means an increase in the alumina-to-caustic soda ratio which leads to a relatively unstable solution, especially under the dilute caustic soda conditions as found in mud lake wash waters. Accordingly, a substantial portion of the alumina contained in the wash waters tends to autoprecipitate in the latter mud washing stages because of the instability of the wash liquors themselves. Consequently, where caustic soda is added to the first stage of a countercurrent washing system operated in conjunction with a red mud lake, still greater amounts must be added to compensate for this added high $A/C$ ratio wash water than when fresh water is used for washing. On the other hand, lime addition in the washing stages causticizes this sodium carbonate from the lake wash waters and materially increases the overall efficiency of washing operation and decreases losses from autoprecipitation in the final stages of washing as well as initially.

The process according to the invention consists of adding lime, as for example in the form of a calcium hydroxide suspension, to the mud washer for reaction principally with the sodium carbonate in the liquor being washed from the residues from digestion. It has been discovered as previously indicated that by adding slaked lime to the mud washers where the total soda concentration is appreciably less than in the main body of the plant liquor stream, such as in the mud settlers, the lime causticization reaction may proceed to effectively raise the caustic soda to total soda ratio in that portion of the liquor stream which on subsequent insertion in the main Bayer stream contributes to an overall increase in amount of caustic soda for extraction purposes.

Generically, the invention contemplates adding lime to the mud washing phase of the Bayer process for the purpose of causticizing the sodium carbonate present in the circulating liquor associated with the mud to form caustic soda and insoluble calcium carbonate. The amount of causticizing to be performed in the mud washing system will, of course, depend on the particular Bayer operation being employed as well as the conditions present in the mud washing phase of the operation. Thus, the caustic soda to total soda ratios in the plant liquors vary with the type of bauxite being processed, as well as with variable processing conditions associated therewith. Nevertheless, to realize the full significance of the invention, sufficient causticizing of the soluble sodium carbonate should be performed in the mud washers to maintain an alumina to caustic soda ratio ($A/C$) in the mud washer overflow of from about .02 to .04 ratio points lower than in the mud settler overflow. As the washing conditions become more dilute, such as in subsequent mud washing stages, lower alumina to caustic soda ratios will be maintained by the reaction so as to prevent autoprecipitation of alumina hydrate.

For bauxites which have been totally extracted, i.e., both monohydrate and trihydrate alumina have been solubilized therefrom, it has been determined that substantially no autoprecipitation will take place during a countercurrent washing system operated with a first stage washing at about 80 grams per liter total soda at about 200° F. when the $A/C$ ratio in the overflow from the washer is about .03 unit less than the $A/C$ ratio which may be tolerated in the clarification operation. In general, lower $A/C$ ratios must be maintained for more dilute washing conditions, and washer overflow analysis for some of the less stable solutions may be maintained as low as an $A/C$ ratio of .565, although in general, such low ratios are not necessary in the overflow of a first stage mud washer with totally extracted residues.

It has also been determined that the efficiency of the lime reaction in the caustic aluminate liquors increases as the temperature increases. Therefore, it is advisable for the most complete utilization of the lime to operate the mud washers under temperatures approaching the boiling point of the solution. In general, however, with substantially organic-free caustic liquors, lime efficiencies as high as 95% have been experienced.

As one specific embodiment of the herein described invention, the material presented in Table III brings out the causticizing effect of the lime with the resultant lowering of the alumina to caustic soda ratio over the first two stages of a simulated countercurrent washing system.

*Table III*

|  | Settler U'F. | Settler U'F. and 2nd Stage O'F. Mixture | First Stage O'F. | Second Stage O'F. |
|---|---|---|---|---|
| T.S.------g./l.-- | -------- | -------- | 81.9 | 42.2 |
| A/C-------------- | .625 | .612 | .592 | .577 |
| A/S-------------- | .519 | .523 | .520 | .521 |
| C/S-------------- | .831 | .855 | .877 | .902 |

For the example presented a simulated mud settler underflow having the indicated characteristic ratios was mixed with the overflow from a previous mud washing cycle (similarly operated) which was at a total soda concentration of 39.7 grams per liter to give the ratios indicated. Thereafter a stoichiometric amount of lime equivalent to change the $C/S$ ratio .05 was added, and first stage washing allowed to proceed for 3.7 hours at 200° F., whereafter the overflow analysis was obtained as shown. The underflow comprising one-third by volume of the stage was thereafter mixed with the third stage of a previous mud washing cycle having a total soda concentration of 20.1 grams per liter and second stage mud washing allowed to proceed for another 3.7 hours at 200° F. The results here presented are indicative of conditions to be expected in actual practice.

It will be noted that caustic soda was produced to the extent of the change in caustic soda to total soda ratio from .831 to .877, with the resultant decrease in $A/C$ ratio of from .625 to .592, consequently increasing the stability of the solution. Moreover, that the causticizing reaction proceeds in subsequent stages is evidenced by the further increase in $C/S$ ratio in the second stage overflow to .902. Correspondingly, the alumina-to-caustic soda ratio decreased to .577 in the second stage overflow.

The material presented in Table III also brings out the intermediate reaction whereby a calcium aluminate is formed and subsequently reacts to solubilize the alumina. Thus, the alumina-to-total soda ratio of the mixture was .523 in the feed to the first stage of the washer and decreased to .520, evidencing an overall insolubilization of alumina during this period. The increase in the $A/S$ ratio to .521 in the second stage brings out the subsequent reaction of the insoluble aluminate to solubilize a portion of the alumina in this second stage. Accordingly, as the washing proceeds, the lime reacts to increase the $C/S$ ratio and decrease the $A/C$ ratio, and a still greater portion of the insoluble aluminate is solubilized. Although only two washing stages are presented in the example, it is customary to have several stages in the washing system, as is well known. With subsequent stages still greater causticizing takes place with the advantageous lowering of the $A/C$ ratio. Part of the increase in $C/S$ ratio is due to the insoluble calcium aluminate reacting with the sodium carbonate to produce sodium aluminate (the soda of which is included in the measurement of C), and insoluble calcium carbonate as well as sodium hydroxide.

A more detailed description of the invention is illustrated in the drawing which shows a preferred schematic embodiment as applied to a countercurrent red mud washing system and its relationship to the more important steps in the Bayer process for extracting alumina, but which is not intended as a limitation of the invention.

Shown schematically are digesters 1 wherein the alumina is extracted from the bauxite, inserted as through line 2 by means of digesting under pressure with concentrated spent liquor, inserted as at 3. After the alumina has been dissolved from the bauxite in the digesters 1, the pressure is continuously released from the slurry by leading the slurry to flash tanks 4 by means of lines 5, the flashed stream usually being utilized for proper heat exchange. From the flash tanks the pregnant or green liquor containing the insoluble red mud residues from digestion are led to a mud settler 6 by means of line 7. Dilution water, as, for example, in the form of mud washer overflow, may be added as through line 8 when the particular bauxite being processed requires dilution subsequent to digestion for mud settling purposes. The supernatant liquor from the mud settler is led to a filter press 9 by means of line 10 wherein the remaining residue particles are removed and washed prior to discarding them to the red mud lake 18 as through line 11. The green liquor is led from the filter press 9 to the autoprecipitator 22 through line 12. The caustic liquor conveyed from autoprecipitator 22 through line 23 is concentrated as by means of the evaporator 24 and is delivered to the digester 1 through line 3. Caustic supply means 25 adds make-up caustic to the circulating liquor going to the digester 1. The make-up caustic may be supplied by external lime-soda ash causticizing or by electrolytic caustic soda or otherwise in known manner. The make-up caustic may be added to the spent caustic liquor before concentration, as by the line 26, or after concentration, as by the line 27, depending upon whether it is desired to concentrate the caustic make-up addition or not. The object is to supply the bauxite in the digester 1 with concentrated caustic liquor of maximum effectiveness for this purpose.

The underflow from mud settler 6 containing the major part of the residues from digestion is led to mud washer 13 through line 14. Wash water from the clear lake 15 is led to the last stage of the washing operation through line 16. As is well known for countercurrent systems, such as those commonly employed, as, for example, with the Dorr type systems, the wash waters from each stage overflow to the next preceding stage and the mud residues flow successively to each succeeding stage and are led from the washing operation, as, for example, through line 17, to a red mud lake 18. The mud residues settle out in the red mud lake and the wash waters overflow to the clear lake for reuse as through line 19.

According to the invention, lime, preferably as a finely divided suspension, may be added to the washing system, as, for example, to washer 13, by inserting slaked lime through line 20. In this manner, causticizing of the sodium carbonate present in the liquor associated with the thickened mud from mud settler 6 takes place in mud washer 13. A substantial portion of the lime reacts in stage 1 to produce caustic soda and insoluble calcium carbonate. That portion of the unreacted lime and insoluble calcium aluminate which has formed and not yet combined with sodium carbonate settles with the mud particles and proceeds to stages 2 and subsequent stages wherein further causticizing takes place. Consequently, the alumina-to-caustic soda ratio is progressively decreased through the subsequent stages of washing in a manner most advantageous to countercurrent washing systems in view of the fact that the caustic aluminate solutions become less stable due to dilution in the subsequent stages.

Depending on the number of stages employed for washing the mud residues, the reactant lime for the desired degree of causticizing may be inserted at an intermediate stage in the mud washing system either in lieu of an initial lime addition, as at 20, or in combination therewith. Generally, it is preferred to add the lime to a mud washing stage which is operating at a total alkaline soda of not greater than about 100 grams per liter. Thus, a lime slurry may be added at an intermediate stage, such as stage 3, through line 21. The object in inserting the lime at an intermediate stage is to select a stage wherein the required degree of causticizing will take place before the washed residues leave the washer as through line 17. The advantage of intermediate stage insertion of lime is the higher caustic soda to total soda ratio obtainable because of the more dilute causticizing conditions. Since the liquors from the subsequent stages are all washed back through the system, it is apparent that the stages prior to the stage where the lime is added will receive the benefit of the caustic produced in the subsequent stages, and consequently contain liquors of a less unstable nature. Another advantage to intermediate washing stage insertion of lime is the fact that the unstable wash waters from the clear lake 15 are more easily controlled by having a greater amount of causticizing taking place in the latter stages.

It is apparent from the foregoing discussion and examples presented that the addition of lime to the mud washing operation independently of the addition of make-up caustic to the feed liquor to the digester 1 has several significant advantages not associated with prior practice. Thus the premature autoprecipitation of alumina in the mud washing stages of the Bayer process may be effectively controlled while at the same time increasing the alumina-carrying capacity of the Bayer liquors by performing a substantial conversion of the sodium carbonate contained therein to caustic soda.

I claim:

1. The method of recovering alumina values in a Bayer system of bauxite digestion with a recirculating caustic liquor which comprises applying the said caustic liquor to the bauxite in a digester to produce soluble sodium aluminate and insoluble red mud, dividing the products of digestion into a major portion which includes the major part of the sodium aluminate solution and a minor portion which comprises the major part of the insoluble red mud, subjecting the first portion to precipitation of alumina hydrate therefrom, supplying make-up caustic to said portion after alumina precipitation and in advance of returning the same to the digester, and returning said portion to the digester, subjecting the second portion to a counter current decantation washing operation with wash liquor for removing the soda and alumina values from the red mud, introducing a material consisting essentially of lime slurry into the underflow of said washing operation to cause lime values capable of causticizing free sodium carbonate in the liquor to be carried along with the red mud, and to create a reduced $A/C$ ratio which decreases the tendency towards alumina precipitation throughout the washing operation, said introduction of lime slurry controlling the accumulation of sodium carbonate in the circulating liquor independently of the caustic make-up supplied to the liquor in the digester, and being effected without substantial dilution of the circulating liquor thereby.

2. The method of claim 1 wherein the counter current decantation washing operation comprises a plurality of stages, and wherein the lime slurry is introduced into the feed of the first stage.

3. The method of claim 1 wherein the counter current decantation washing operation comprises a series of stages and wherein the lime slurry is introduced into an intermediate stage whereby said lime slurry mixes with the red mud during washing thereof and prior to the discharge of the red mud from the washing system.

4. In a Bayer alumina recovery process comprising digestion of alumina ore by recirculated caustic liquor, diluting the product of digestion with wash liquor, dividing the dilute product into a first portion containing a major part of the alumina-bearing liquor and a second portion containing the major part of the red mud, precipitating alumina from the liquor of the first portion, concentrating said latter liquor and supplying same with make-up caustic, recirculating said concentrated liquor with make-up caustic to the digester, washing the red mud of the second portion in a counter current decantation washing system, said recirculated caustic liquor tending to accumulate excess uncausticized sodium carbonate produced from the action of caustic soda in said liquors upon organic materials entering the system and upon $CO_2$ absorbed from the atmosphere, introducing a material consisting essentially of lime, independently of the make-up caustic added to the said recirculated caustic liquor of the first portion, into the red mud washing system to causticize said excess sodium carbonate and to increase the $C/S$ ratio and reduce the $A/C$ ratio in the washing system to reduce the tendency to autoprecipitation of alumina hydrate in the washing system, the overflow of said washing system being employed to dilute the product of digestion and the underflow carrying out the red mud and the calcium from said lime introduction.

5. In a Bayer type alumina extraction process including a recirculation of digestion liquor and a mud washing operation employing mud washing liquor discharged into the digestion liquor and being subject to the accumulation of sodium carbonate as process carbonation, the method of controlling the process carbonation which comprises adding soda make-up to the digestion liquor and adding a material consisting essentially of lime to the mud washing operation to combine with the sodium carbonate in the mud washing liquor.

References Cited in the file of this patent

UNITED STATES PATENTS

| | | |
|---|---|---|
| 1,013,022 | Kendall | Dec. 26, 1911 |
| 1,747,759 | Dore et al. | Feb. 19, 1930 |
| 2,522,605 | Cundiff | Sept. 19, 1950 |
| 2,992,893 | Soudan et al. | July 18, 1961 |

FOREIGN PATENTS

| | | |
|---|---|---|
| 506,885 | Great Britain | June 6, 1939 |

OTHER REFERENCES

Gould: "Industrial and Engineering Chemistry," vol. 37, No. 9, September 1945, pages 796 to 802.

Sherwin: "Journal of Metals Transactions AIMe," vol. 188, April 1950, pages 661 to 667.

UNITED STATES PATENT OFFICE
CERTIFICATE OF CORRECTION

Patent No. 3,120,996                          February 11, 1964

John L. Porter

It is hereby certified that error appears in the above numbered patent requiring correction and that the said Letters Patent should read as corrected below.

Column 3, line 62, after "presents" strike out the comma; column 5, line 64, for "hase" read -- has --; column 11, Table II, column 7, line 3 thereof, for ".529" read -- .522 --, line 4 thereof, for ".852" read -- .859 --; column 12, line 15, for "506" read -- .506 --.

Signed and sealed this 22nd day of December 1964.

(SEAL)
Attest:

ERNEST W. SWIDER                          EDWARD J. BRENNER
Attesting Officer                              Commissioner of Patents